United States Patent
Hastings et al.

(10) Patent No.: US 8,501,126 B1
(45) Date of Patent: Aug. 6, 2013

(54) DYNAMIC MANDREL CATALYTIC REACTOR METHOD, APPARATUS, AND SYSTEM

(75) Inventors: Nathan Hastings, Dallas, TX (US); Stephan E Hastings, Hemet, CA (US); Frank T. Klisura, Norco, CA (US)

(73) Assignee: Proxxent Technologies, LLC, Anaheim, CA (US)

( * ) Notice: Subject to any disclaimer, the term of this patent is extended or adjusted under 35 U.S.C. 154(b) by 0 days.

(21) Appl. No.: 13/477,135

(22) Filed: May 22, 2012

(51) Int. Cl.
- *B01D 53/34* (2006.01)
- *B01D 53/38* (2006.01)
- *B01D 53/74* (2006.01)
- *B01D 53/86* (2006.01)
- *B01J 19/00* (2006.01)
- *B01J 19/18* (2006.01)

(52) U.S. Cl.
USPC ........... 423/210; 423/439; 422/120; 422/122; 422/168; 422/177

(58) Field of Classification Search
USPC .................. 423/210, 439; 422/120, 122, 168, 422/177
See application file for complete search history.

(56) References Cited

U.S. PATENT DOCUMENTS

| | | | |
|---|---|---|---|
| 3,159,450 A | 12/1964 | Asker Etal | |
| 3,607,133 A | 9/1971 | Hirao | |
| 4,047,895 A | 9/1977 | Urban | |
| 4,702,892 A | 10/1987 | Betz | |
| 4,952,374 A * | 8/1990 | Baillie | 422/110 |
| 5,240,470 A | 8/1993 | Wright | |
| 6,203,763 B1 | 3/2001 | Theiler | |
| 2011/0176987 A1 | 7/2011 | Haggerty et al. | |

FOREIGN PATENT DOCUMENTS

| | | | |
|---|---|---|---|
| JP | 61-157332 A | * | 7/1986 |
| JP | 63-12326 A | * | 1/1988 |
| JP | 5-115748 A | * | 5/1993 |

* cited by examiner

Primary Examiner — Timothy Vanoy
(74) Attorney, Agent, or Firm — Law Office of Robert E. Kasody, P.C.

(57) ABSTRACT

An method and apparatus is disclosed that causes a chemical reaction to reduce emissions. The method includes a mandrel that is plated, bonded, or by other means affixed with a catalyst. The mandrel moves to control a rate of catalyst available to react via a controlled change in contact surface area per unit volume flow to remove or reduce effluent matter.

18 Claims, 8 Drawing Sheets

DYNAMIC MANDREL CATALYTIC REACTOR METHOD, APPARATUS, AND SYSTEM

BACKGROUND

1. Field of the Disclosure

The present disclosure relates generally to the field of catalytic reaction and reduction systems that react effluent in the form of solids or fluid. More particularly, the present disclosure relates in one embodiment to a system for reducing effluents from a mist so that emissions are reacted to provide safe breathing conditions after a decontamination process.

2. Description of Related Technology

A conventional catalytic reactor consists of a ceramic honeycomb matrix coated with platinum utilized to condition automobile emissions. Another conventional catalytic reactor includes an effervescing bed of a liquid catalyst to condition and reduce effluent process gasses. Another catalytic reactor utilizes catalyst coated pellets through which gases or liquids are conditioned and reacted to remove or change the unwanted components of process effluent. Within the utility power industry, the conventional selective catalytic reactors occupy a large volume and size based on the large surface exposure area needed to react effluents, e.g., gases, chemicals, and or other undesired chemical or waste products or additives. In addition, effluents may include chemicals or gases that may require regulation by local, state, or federal agencies. For an energy power plant to provide sufficient electrical power to several counties, a conventional selective catalytic reactor could have thousands of nested matrices coated with a catalyst to react unwanted components of effluents produced. These nested matrices may require a multitude of ancillary control or regulation equipment. As a result, these nested matrices and regulation equipment may occupy several buildings. Another feature of conventional reactors is a high incidence of fouled elements that reside at or reside near one or more exposed surfaces in a fixed matrix or in a rotatable catalyst plated armature. As a result, fouled elements may affect a large change in the capacity of the reactor. Furthermore, these conventional reactors may present significant backpressure, which may be required to be overcome.

In summary, the prior art provides limited flexibility on size of the reactor for a given level or volume of effluent as well as requiring significant equipment, building space, and requiring extensive cleaning of fouled elements. Furthermore, the prior art has limited capability for reducing, preventing, or cleaning partially or substantially fouled elements around or about on the one or more catalytic reactor surface areas.

Thus, what are needed are apparatus and methods for a catalytic reactor process that provide advantages over conventional systems. These advantages would include, interalia, preventing or reducing fouling, halting, partial or full non-functionality of one or more reactors or effluent catalytic reaction units, having increased capacity, reduced equipment or size requirement. In addition, other advantages would include improved air or emissions flow in accordance with specifications or requirements, and ability to vary or adapt in accordance with one or more variables including time, velocity, gas input flow, gas output flow, upon detection or in accordance with a partial or substantial increase in effluents.

SUMMARY

In one aspect, a method is disclosed to reduce emissions via catalytic reaction caused by moving mandrel possessing one or more contoured orifices plated with one or more reactive materials operatively coupled to a drive. In one example, mandrel and drive controls rate of catalytic reaction on contact surface per unit volume flow to affect level of chemical change in process effluent. In one alternative, a method is disclosed to reduce emissions via catalytic reaction caused by moving mandrel possessing one or more foils plated with one or more reactive materials operatively coupled to a drive. In one variant, mandrel and drive controls rate of catalytic reaction on contact surface per unit volume of flow to affect level of chemical change in process effluent.

In yet another alternative, a method is disclosed to reduce emissions via catalytic reaction caused by moving mandrel possessing one or more microstructures plated with one or more reactive or conductive materials operatively coupled to a drive. In one variant, mandrel and drive controls rate of catalytic reaction on contact surface per unit volume of flow to affect level of chemical change in process effluent as well as augment ability to detect effluent.

In one variant, moving may include any or all the following: vibrating, rotating, or cycling the mandrel in a controlled manner to cause contoured orifices on the mandrel to interact with reactant fluid so as to increase or decrease rate of exposure of contact surface per unit volume flow based on a controlled change in rate of cycling, rotating, or vibrating the mandrel.

In yet another variant, moving may include any or all the following: vibrating, rotating, or cycling the mandrel in a controlled manner to cause foils on mandrel to interact with reactant fluid so as to increase or decrease rate of exposure to contact surface per unit volume of flow based on change in rate of cycling, rotating, or vibrating mandrel.

In yet another variant, moving may include any or all the following: vibrating, rotating, or cycling mandrel, which is plated with highly conductive material, or highly reactive material, and operates as highly specialized electrode which moves in controlled manner to cause contoured orifices, microstructures, structures, or foils on mandrel to interact with effluent.

In one variant, the interaction with the mandrel maximizes exposure to contact surface per unit volume of flow affecting controlled region of turbulent mixing at contact surface that in turn augments an ability to detect accurate representations of fluid component concentrations of effluent.

In yet another variant, the method may include shedding vortices of microstructures formed on either side to sweep reacted material free.

In yet another variant, moving a mandrel may include: applying any or all the following: non-uniform velocity, variable frequency, or motions involving one or more axes to create desired effect to control rate of catalyst available to react within process fluid, or solid, to throttle the reaction via a controlled change in contact surface area. In still another variant, the method may include detecting a capacity to react changes via a controlled change in mandrel speed. In yet another variant, the method may include detecting presence of reactant and a concentration of selfsame reactant.

In yet another aspect, an apparatus including mandrel that causes a chemical reaction. In one example, mandrel is capable of being plated, bonded, or by other means affixed with a catalyst. The mandrel is movable to control a rate of catalyst available to react via a controlled change in contact surface area per unit volume of flow to reduce or remove effluents because of a reaction process. In one variant, mandrel includes foils that create a controlled turbulent flow throughout mandrel contact surfaces. In one variant, mandrel makes use of foils to generate a region of concise mixing. In one example, controlled turbulent flow may include harmonic shedding of vortices or processes that cause slipstreaming to induce the turbulent flow into pathways. Continuing with the example, the controlled turbulent flow unitizes and rectifies the turbulent flow through the mandrel. In yet another variant, flow through mandrel is sealed to prevent bypassing or leakage.

In one variant, the mandrel includes bluff bodies or various shaped rods to cycle a controlled shift in recombinant flow causing harmonic shedding of vortices. In another variant, drive motor operatively coupled to mandrel imparts controlled cyclic rotation of the mandrel to create a predetermined rate of rotation that controls a change in the contact surface area to maintain a predetermined capacity to react. In yet another alternative, a drive motor may be operatively coupled to mandrel to impart controlled cyclic rotation of mandrel to maximize volume flow over contoured foils that induce flow thru mandrel. In yet another variant, drive motor may be operatively coupled to mandrel to impart vibration on microstructures, or structures of mandrel to shed vortices on one or both sides of microstructures, or structures.

In one alternative, mandrel and drive motor sweep the microstructures or structures free of reacted material to aid in increasing or maintaining reaction cycle on a contact surface. Furthermore, micro-structures, or structures, serve purpose of cleaning contact surface area that would otherwise be capable of forming molecular layer responsive to rate of decomposed reactant and insulate reactant from catalyst and limit rate of reaction.

In another embodiment, the foils are designed to induce shifting turbulent flows that sweep the contact surface clean to increase rapid reaction cycle. In one variant, the mandrel form includes a small surface area to actual volume ratio to react process gas concentrations within a tight tolerance. The mandrel may include at least one of silver plating and the reactant material includes $H_2O_2$ mist or vapor.

In yet another aspect, a system is disclosed to reduce emissions from a catalytic reaction. In one such system, a mandrel having a mandrel form is configured to move one or more contours containing one or more catalysts. The movement in combination with mandrel form including contoured foils controls the rate of catalytic reaction on contact surface per unit volume flow to control components of effluent emitted. A drive motor moves mandrel in a manner to cause an interaction with the one or more reactant to expose mandrel contact surface per unit volume flow affecting controlled change in contact surface area.

These and other embodiments, aspects, advantages, and features of the present disclosure will be set forth in part in the description which follows, and in part will become apparent to those skilled in the art by reference to the following description of the disclosure and referenced drawings or by practice of the disclosure. The aspects, advantages, and features of the disclosure are realized and attained by means of the instrumentalities, procedures, and combinations particularly pointed out in the appended claims.

DETAILED DESCRIPTION

Figure 1:
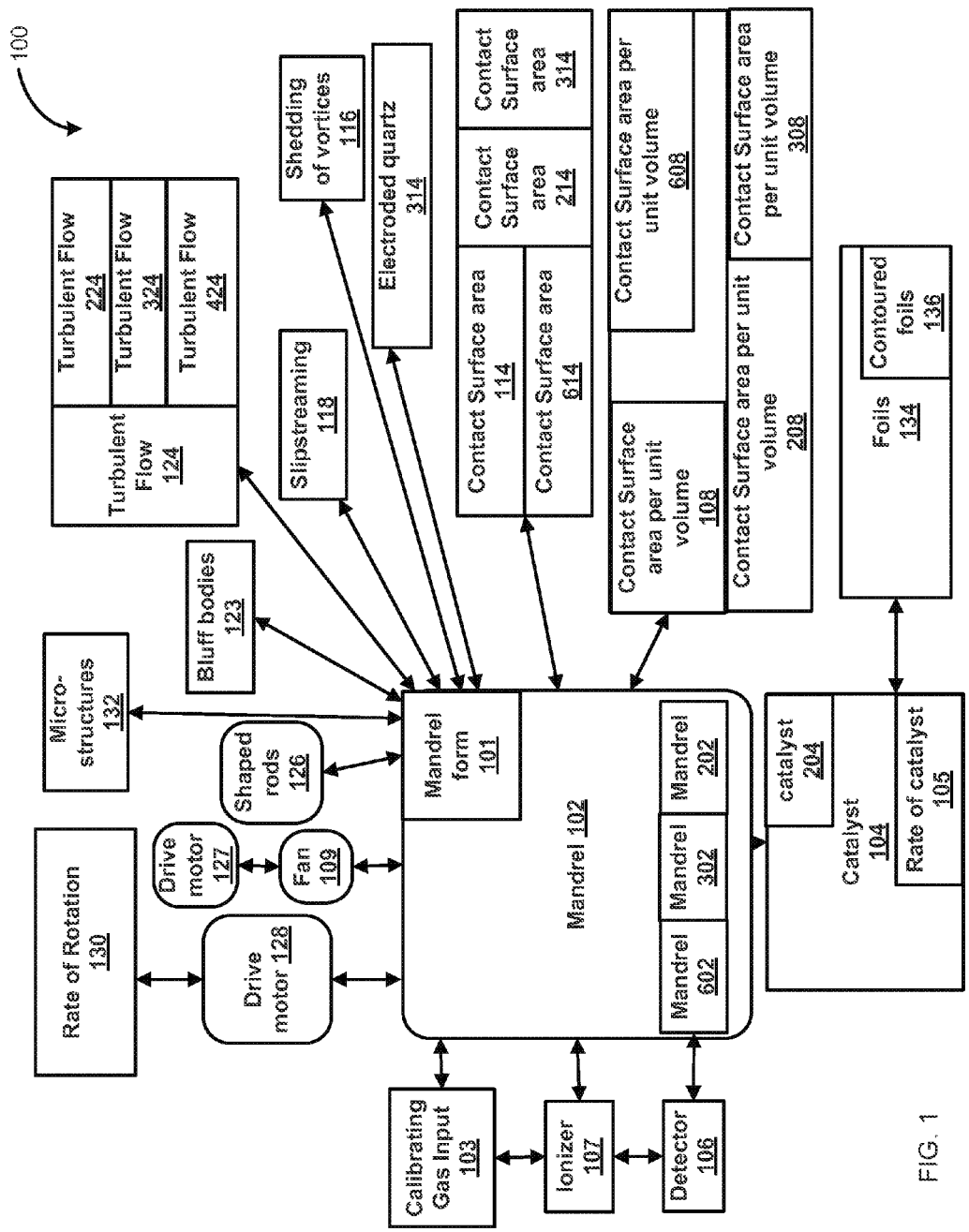
FIG. 1 is a block diagram of a dynamic mandrel catalytic reactor illustrating principles of the present disclosure.

Reference is now made to the drawings wherein like numerals refer to like parts throughout.

As used herein, the term "mandrel" refers to, but is not limited to, a tight fitting metal spindle or bar, often cone shaped, that may be inserted into chamber, holder, or device to hold it while being machined or turned on a lathe; a metal rod or bar used as a core around which metal, glass, or the like is cast, molded, or shaped as in forging, or wire is wound; a form that metal work is pressed against in a spinning or rotating motion; a strategically shaped tool that is coated, bonded, plated, or by other means appropriate thereby affixed unto a catalyst for the purpose of doing the work at its very surface of acting on the reactant; as related to the catalytic reactor, a core or mandrel is a strategically shaped tool coated, bonded, plated, or by any means appropriate thereby affixed unto a catalyst or a highly conductive material for the purpose of doing the work at a contact surface, e.g., a contact surface area, and acting on the reactant, in one illustration, a mandrel is placed in yielding a highest amount of surface area contact based on the shape of, and/or type of motion imparted on the mandrel; furthermore, "mandrel" refers to core in which something serving as tool to do work is formed around or by some process fixed to that core and that core is moved in fashion consistent with work to be done;

As used herein, the term "mandrel form" or "form" refers to, but is not limited to, a shape of a surface designed to be vibrated, rotated, or otherwise moved in the presence reactant flow to augment reaction quantity;

As used herein, the term "motion type" refers to, but is not limited to, a path that describes units of motion contained in a partial or a full cycle;

As used herein, the term "flow rate" refers to, but is not limited to, a rate which reactant is moved past or through a mandrel in a confined space measured in unit volume of time;

As used herein, the term "rate of catalyst availability" refers to, but is not limited to, a rate that a catalyst surface is cleared of reacted material;

As used herein, the term "fluid" or "fluids" refers to, but is not limited to, one or more gases, liquids, transitions of phase, or flow of solids suspended in an entraining fluid;

As used herein, the term "contoured orifice" or "contoured orifices" refers to, but is not limited to, one or more specially designed openings designed to entrain flow based on the path of motion imparted to the mandrel containing the selfsame contoured orifices;

As used herein, the term "slipstreaming", refers to, but is not limited to, an edge effect caused by contours that reside at or in close proximity to an orifice;

As used herein, the term "foil" refers to, but is not limited to, a shape of the rods used on mandrel designed to produce various effects which augment cycling of reaction at contact surface when motion is imparted to the selfsame foil;

As used herein, the term "structures" refers to, but is not limited to, typically the family of vibrating mandrels that contain large shapes designed to condition flows at the catalyst contact surface for the purpose of augmenting the reaction cycle at the mandrel contact surface; and As used herein, the term "microstructure(s)" refers to, but is not limited to, typically the family of vibrating mandrels that contain microscopic shapes designed to condition flows at the catalyst contact surface for the purpose of augmenting the reaction cycle at the mandrel contact surface as well as causing a region of controlled turbulence;

As used herein, the term "bluff body" refers to, but is not limited to, a broad, flattened front surface; and As used herein, the term "shaped rod(s)" refers to, but is not limited to, a structure that when inserted or placed into process flow causes a controlled rate of catalytic reaction and augment cycling of reaction at a contact surface area or a contact surface area per unit volume.

Overview

In one salient aspect, the present disclosure discloses apparatus and method of processing, inter alia, such as gases, solids, and liquids (e.g., fluids) that are by-products of one or more reaction processes, including commercial power and energy generation and distribution. The mandrel being plated, bonded, or by other means affixed with a catalyst. The mandrel configured to be movable to control a rate of catalyst available. In one example, the rate of catalyst available to react is via a controlled change in contact surface area per unit volume of the flow.

Broadly, the present disclosure generally provides a system and method for reducing emissions via a catalytic reaction by moving a mandrel having reactive materials to at least partially, functionally control a rate of catalytic reaction on a contact surface per unit volume flow to control a level of one or more components of the effluent emitted. The system produced according to the present disclosure may find beneficial use for reducing or controlling emissions or condition air flow for one or more processes including, but not limited to, energy production, energy storage, air disinfection, pollution reduction, contaminant removal or the like. The dynamic reactor produced by the present disclosure is a small fraction of the size of a conventional static catalytic reduction device and requires much less catalyst to operate than these conventional systems.

As such, the system may also be useful for home, commercial, or other settings where space is limited or can be better utilized for additional or ancillary operations or functionality. The dynamic mandrel catalytic reactor may be used in industrial or commercial settings for emissions conditioning where a level of contaminants or emissions is non-constant. For instance, where a level of contaminants or emissions changes as a function of time, temperature, pressure, or the like, there is a need for the catalytic reaction of these particles to have a non-uniform velocity, variable frequency, or involve motions involving one or more directional locations (e.g., axes of rotation) the dynamic mandrel catalytic reactor is designed for this task.

As such, many emissions reduction settings may require changes in controlling a rate of catalyst available to react with a liquid, a gas, other phase, transition of phase, or throttling a reaction via a controlled change in contact surface area. For instance, effluents, such as hydrogen peroxide, removed using the system produced by the present disclosure. Although the following discussion may use removal of hydrogen peroxide in a hospital setting as an exemplary demonstration, it is to be understood that this discussion is not limiting and that the present disclosure may be used in other suitable applications such as installed tandem to HVAC systems for decontamination applications.

Exemplary Embodiments of the Present Disclosure

Referring now to FIGS. 1-8, exemplary embodiments of the dynamic mandrel catalytic reactor system of the present disclosure are described in detail. It will be appreciated that while described primarily in the context of catalytic reactor, at least portions of the apparatus and methods described herein may be used in other applications, such as for example and without limitation, control systems including components such as transducers, sensors, and electrical and/or optical components within manufacturing or assembly line process to control emissions or condition air flow.

Moreover, it will be recognized that the present disclosure may find utility beyond purely emissions and air flow concerns. For example, the dynamic catalytic reactor mandrel system and apparatus described subsequently herein may conceivably be utilized to improve other applications; e.g., increasing functionality and decrease electrical consumption of circuits utilized to improve energy efficiency and increase accuracy of measured or removed quantities. The calculated quantities may include improvement of quality control of objects traveling through an assembly line process for determining which portions of the process are running efficiently and which portions may require process improvements or modifications, e.g., system restart. Other functions might include module assembly, maintaining system parameters, and system monitoring and initiation (e.g., for purposes of transceivers that provide multiple methods and user choices improving testing and/or operations before, during or after energy or power distribution or manufacturing, and so forth). Myriad of other functions will be recognized by those of ordinary skill in the art given the present disclosure.

Referring to FIG. 1, in operation, apparatus 100 includes mandrel 102 and mandrel form 101 that causes a chemical reaction. Mandrel 102 is capable of being plated, bonded, or by other means affixed with catalyst 104. Mandrel 102 is configured to be movable to control a rate of catalyst 105 available to react via a controlled change in contact surface area per unit volume 108 flow. In one instance, mandrel 102 includes foils 134 and/or contoured foils 136 that create a controlled turbulent flow 112 throughout contact surface area 114 including harmonic shedding of vortices 116. Contact surface area 114 may include processes that cause slipstreaming 118 to induce turbulent flow 124 into pathways that unitize and rectify turbulent flow 124. In one variant, mandrel 102 includes bluff bodies 123 or shaped rods 126 to cycle a controlled shift in recombinant flow causing a harmonic shedding of vortices 116.

In one embodiment, drive motor 128 is operatively coupled to mandrel 102 to impart a controlled cyclic rotation of mandrel 102 to create a predetermined rate of rotation 130 that controls a change in mandrel contact surface area 114 to maintain a predetermined capacity to react. In one variant, drive motor 128 may be operatively coupled to mandrel 102 to impart a controlled cyclic rotation of mandrel 102 to maximize volume flow over foils 134 or contoured foils 136 that induce flow thru mandrel 102. In another variant, drive motor 128 operatively coupled to the mandrel to impart a vibration on micro-structures (e.g., micro-contours) 132 of mandrel 102 for shedding vortices 116 on one or both sides of the microstructures 132 to sweep micro-structures 132 free of reacted material to aid in increasing a reaction cycle of contact surface area 114.

In one variant, contact surface area 114 is capable of forming a molecular layer responsive to rate of decomposed reactant and to insulate reactant from catalyst and limit a rate of reaction. Contoured foils 136 are designed to induce of shifting turbulent flows that sweep contact surface area 114 clean to increase rapid reaction cycle. For example, mandrel 102 includes a large surface area, e.g., contact surface area 114, to actual volume, e.g., volume 140, ratio to react process gas concentrations within a tight tolerance. Mandrel 102 may include at least one of silver plating and reactant material includes $H_2O_2$ gas.

Figure 2:
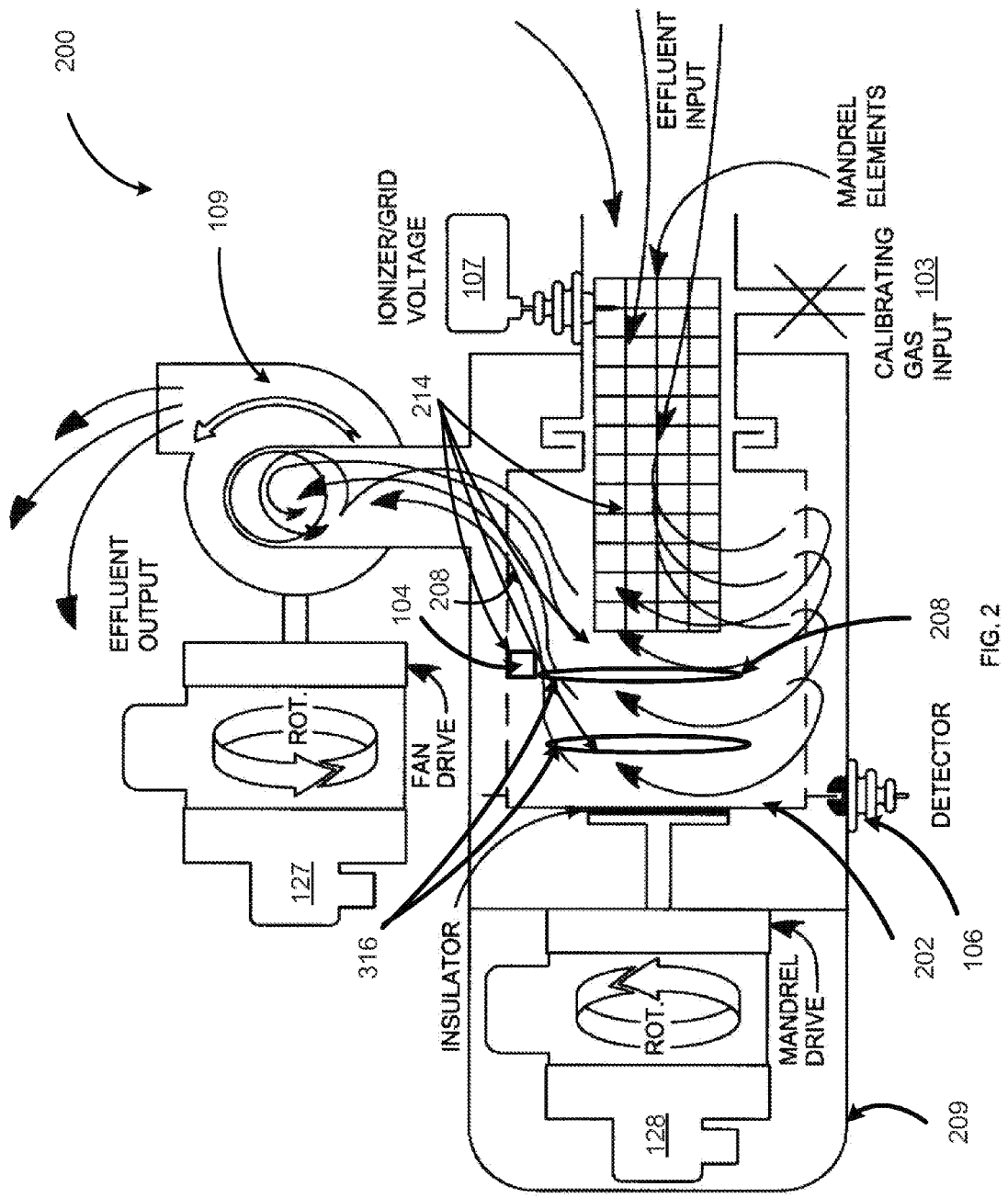
FIG. 2 is an illustration of a dynamic mandrel catalytic reactor using a rotating mandrel drum driven by a motor that is an example of a system in accordance with the present disclosure.

Referring to FIG. 2, system 200 illustrates operability of FIG. 1 to reduce emissions from a catalytic reaction. In one variant, ionizer 107 electrically charges mandrel 202. For example, detector 106 detects presence of specified fluids via mandrel 202, which provides as a specialized electrode, e.g., electrode 314 having grid emitter, that is charged by ionizer 107. Charged mandrel 202 attracts oppositely charged effluent at input onto control surface area 214 and form control surface area per unit volume 208 flow. Advantageously, electrical charge of mandrel 202 assists in controlling rate of catalyst 206 reaction on contact surface area 214 and distributed throughout contact surface area per unit volume 208 flow so as to control an emitted level of impurities. Drive motor 228 moves, vibrates, rotates, or the like, mandrel 202, in a manner to create a turbulent interaction with one or more reactants or catalysts 104 and control a change in contact surface area per unit volume 208 flow.

Figure 4:
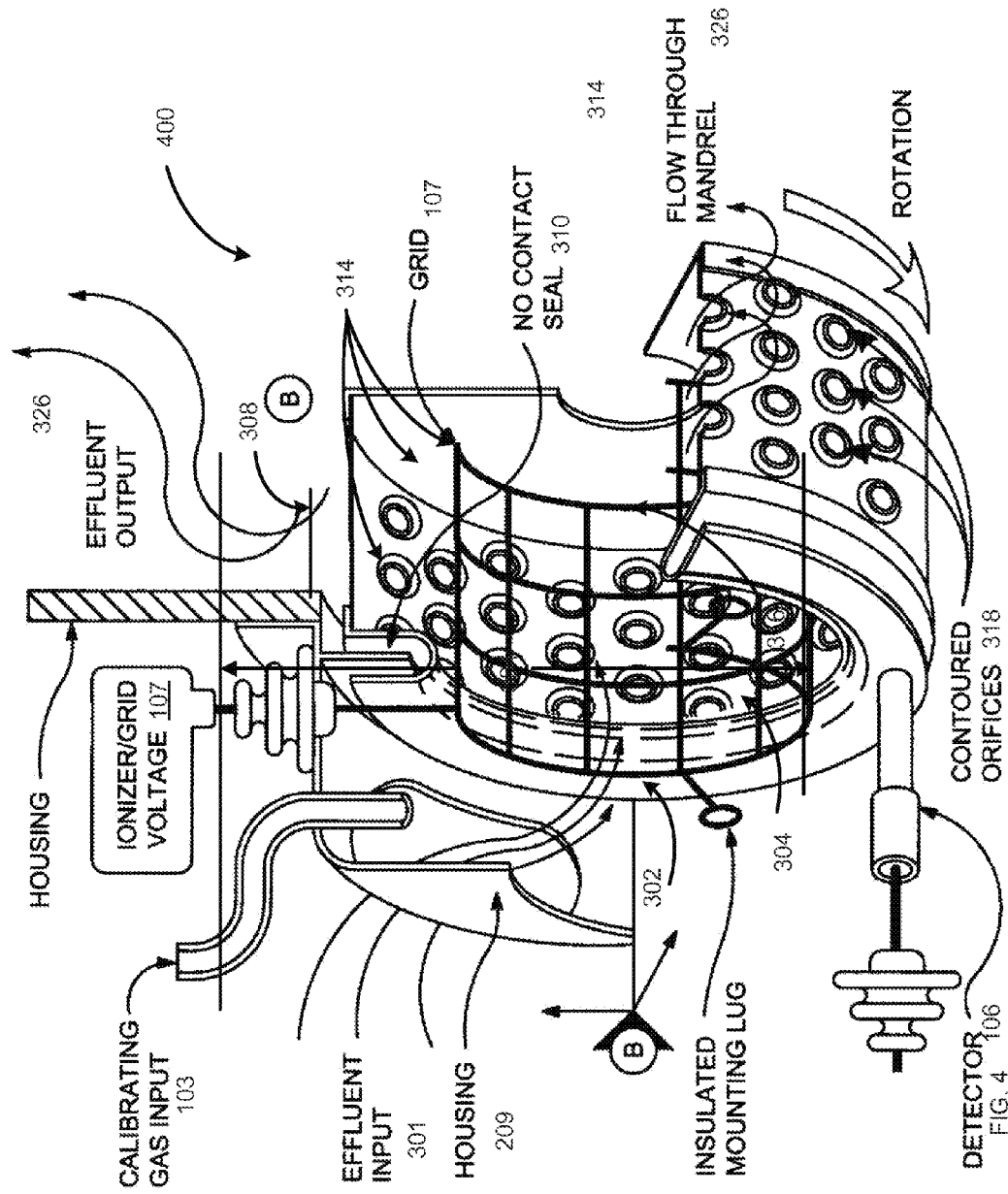
FIG. 4 is an illustration of the contoured orifices of FIG. 3.
Figure 5:
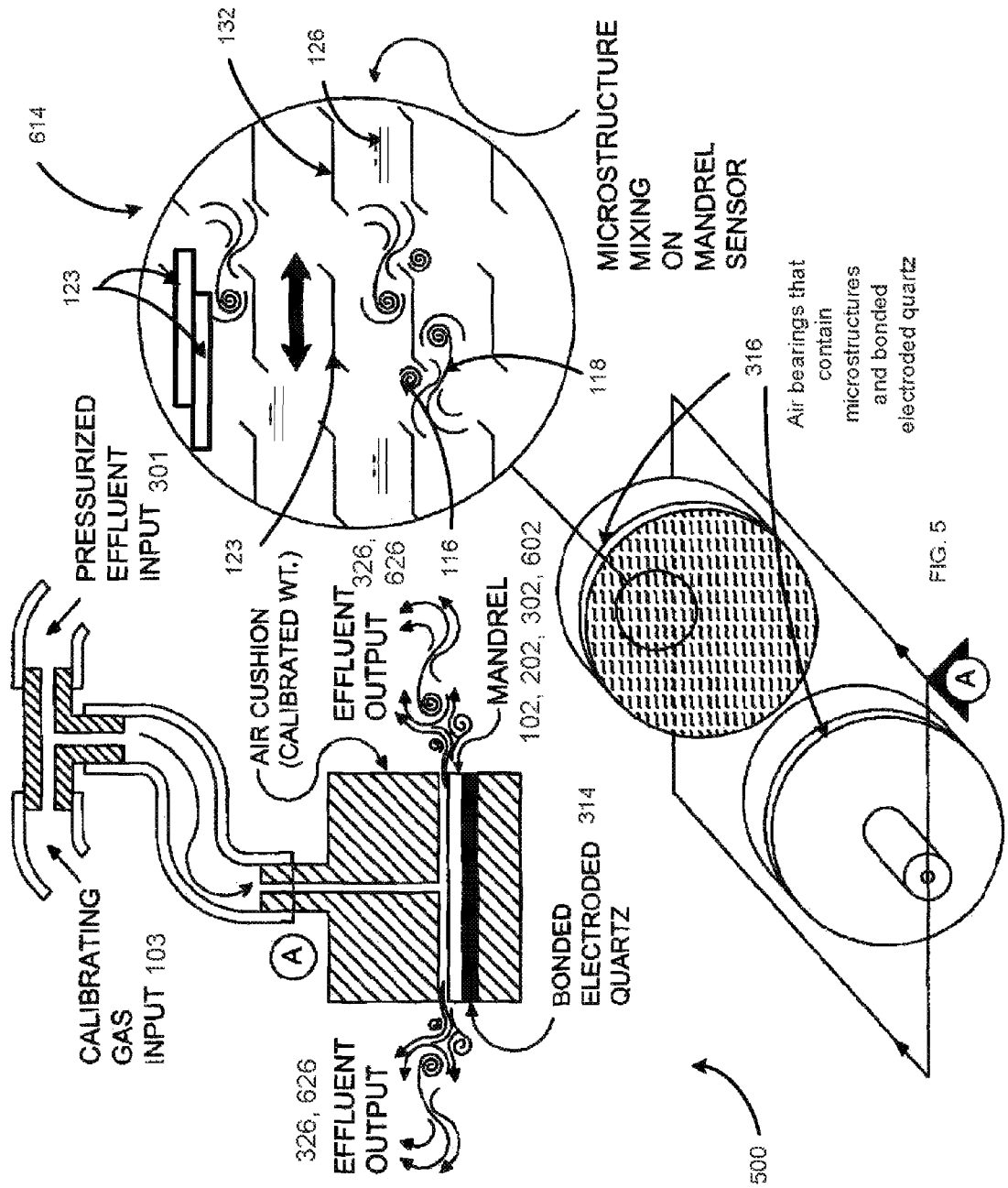
FIG. 5 is an illustration of an electrode on quartz illustrated in FIGS. 3 and 6 of the present disclosure.
Figure 7:
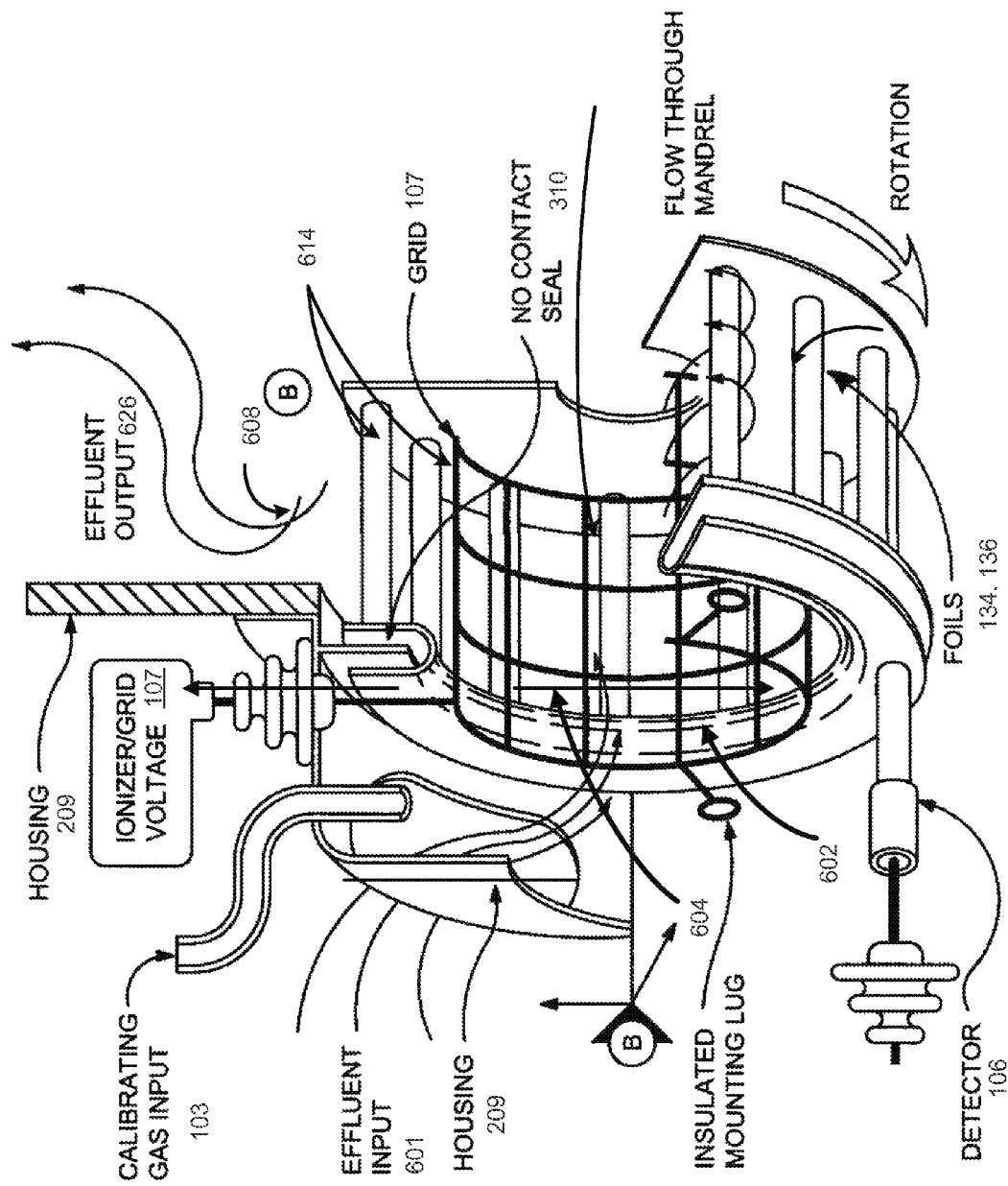
FIG. 7 is an illustration of foils of FIG. 6.

In one instance, calibrating gas port 103, including noble gas detector 106, draws in constituent gases, e.g., gases from effluent, into intake of mandrel 202. Grid voltage applied to grid emitter, observed in throat of mandrel 202 ionizes calibrating gas, e.g., gas that has an electrical value that is known, that creates fluid mixing at surface of mandrel 202. A calibrated volume of ionized gas is injected into input effluent of system 200. Mandrel 202 is disposed or impregnated on its contact surface area 214 with one or more catalysts 104 or highly conductive material, e.g., gold plating or gold plated microstructures 132, foils 134 or contoured foils 136, or contoured orifices 318, as illustrated in FIGS. 4, 5, and 7.

In an example, detector 106 senses presence of effluent at input of mandrel 202 while moving. In one example, detector 107 includes a field effect transistor that collects an electrical charge on mandrel 202. Ionized gas produced by effluent plus calibrating gas produces an averaged (due to mixing) field effect transistor value. The averaged value gets compared to a volume of effluent collected at a chosen temperature and pressure over time. The averaged value indicates a signature of the noble gas. For composite noble gases, algorithms process the mixture to determine percentage and reaction potential of each noble gas. Advantageously, by processing the mixture and determining its composition, this will aid in determining effluent mixture in keeping contact surface clean as well as cycle the contact surface at a higher rate to determine the combinations at standard temperature and pressure.

Upon mandrel 202 motion, turbulent flow 124 is created for effluent over a contact surface area per unit volume 208 that causes mixing of an input of effluent, which is then detected and measured to determine effluent properties by detector 106. Calibrating gas port 103 allows for the detection of gases, e.g., noble gases, to optimize or maximize environment conditions and other properties, e.g., velocity, movement, vibration of mandrel 202 and/or electrode movement, to assist achieving an improved efficiency performing mandrel.

Advantageously, mandrel 202 may conduct electricity with a high degree of sensitivity; thus, mandrel can be designed to react the highest contact surface reaction rate at the minimum revolutions per minute (RPM). Effluent input is then mixed in a uniform fashion by micro-structures 132, contoured orifices 318, or foils 134, 136 that unitize and rectify the flow as it passes through mandrel 202. A plate detector is placed in contact with the surface of mandrel 202, or near the surface of mandrel. In another example, mandrel 202 is found in foil designs. In one example, foil 134, 136 is designed to have a flat trailing edge to induce a vortex of rapidly spinning flow that processes back and forth across a rear face of foil 134, 136.

In an exemplary embodiment of system 200, a hospital room may be disinfected by filling with a fine vapor of 7% aqueous solution of hydrogen peroxide ($2H_2O_2$). In operation, an atomizer emits a vapor that passes through positive ionizing electrodes (e.g., ionizer 107). In this example, in about 15 minutes, a room of 20 foot by 100 foot may have around 180 ppm (parts per million) of ionized hydrogen peroxide. System 200 draws in the vapor into its inlet using suction fan 109. Suction fan 109 rotates, e.g., around 3000 revolutions per minute (RPM), and draws vapor into and through a plating formed of a sealed rotating catalyst 104 on mandrel 202. Separate motor 128 drive mandrel 202 to cycle, e.g., around 5000 rpm. Rotation of mandrel 202 induces effluent flow that is feed into an inlet of suction fan 109. During operation, mandrel 202 is insulated from rest of system 200 and is negatively charged by an ion-emitting electrodes (e.g., ionizer 107). Due to opposing charge being created, positively charged hydrogen peroxide vapor are electrically drawn onto control surface area 214 of catalyst 104 at a faster rate. In one instance, mandrel 202 may be mounted in tube 209 and serve as a suction input for suction fan 109. Tube 209 also serves a dual purposed because it acts as a support for an internal motor for mandrel 202. After hydrogen peroxide passes through mandrel 202, catalyst reacts with hydrogen peroxide that causes it to break down into $2H_2O$, and $O_2$ (e.g., water and oxygen respectively). In one example, system 200 having an input to output flow of effluent around 800 cubic feet per minute can reduce a level of effluent, for instance, of hydrogen peroxide vapor in 10 minutes for a 2000 square foot room from 180 ppm to 1 ppm.

Figure 3:
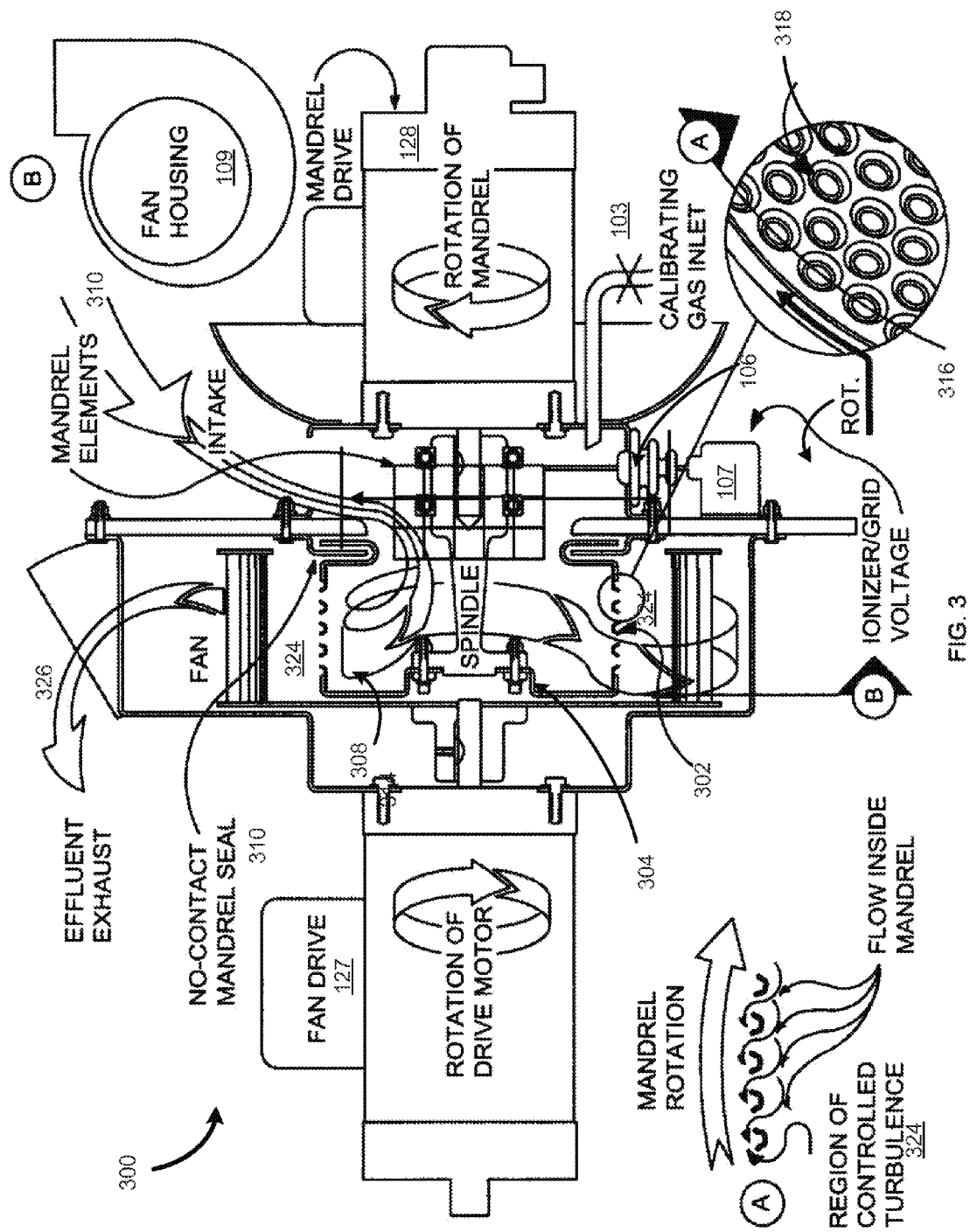
FIG. 3 is an illustration of a dynamic mandrel catalytic reactor using contoured orifices on a rotating mandrel drum driven by a motor that is a physical implementation of FIG. 2.

Referring to FIG. 3, system 300 provides an illustration of dynamic mandrel catalytic reactor using contoured orifices 318 on rotating mandrel drum 302 driven by motor 128 which system is an implementation of FIG. 2. In operation, system 300 draws in effluent input 301 to process through intake duct and channels effluent directly into inner surface 304 of mandrel 302 that is rotating, for example in a clockwise direction, by drive motor 128. Before passing to mandrel 302, effluent passes over labyrinth non-contact mandrel seal 310, which prevent effluent passing unprocessed from input to output of mandrel 302. Mandrel 302 attracts effluent by obtaining an oppositely polarizing charge from that of effluent. For example, mandrel 302 may be oppositely polarizing charged by emission from source generator, e.g., obtain 7 kv oppositely emitted charge by 7 kv ion generator 312. Contoured orifices 318, for example, illustrated in FIGS. 3 and 4, induce effluent into an inner surface 304 of mandrel 302. Counter rotating fan 109, e.g., counter rotating squirrel cage fan to that of direction of mandrel 302 rotating, is positioned along a direction flow of mandrel 302, and aligned along outer diameter surface of mandrel 302 to create a controlled turbulence region 324. Controlled turbulence region 324 creates mixing, flow rectification, and unitization of effluent. The mandrel 302 is disposed or impregnated on its contact surface area 314 formed by catalyst 104, gold-plated microstructures 132, contoured orifices 318, and/or foils 134, 136 that interact with effluent via region of controlled turbulence 324. Upon completion of processing, effluent of contact surface area per unit volume 308 flow passes through mandrel 302, reacted effluent is exhausted by counter rotating squirrel cage fan 109 via exhaust of effluent output 326.

Figure 6:
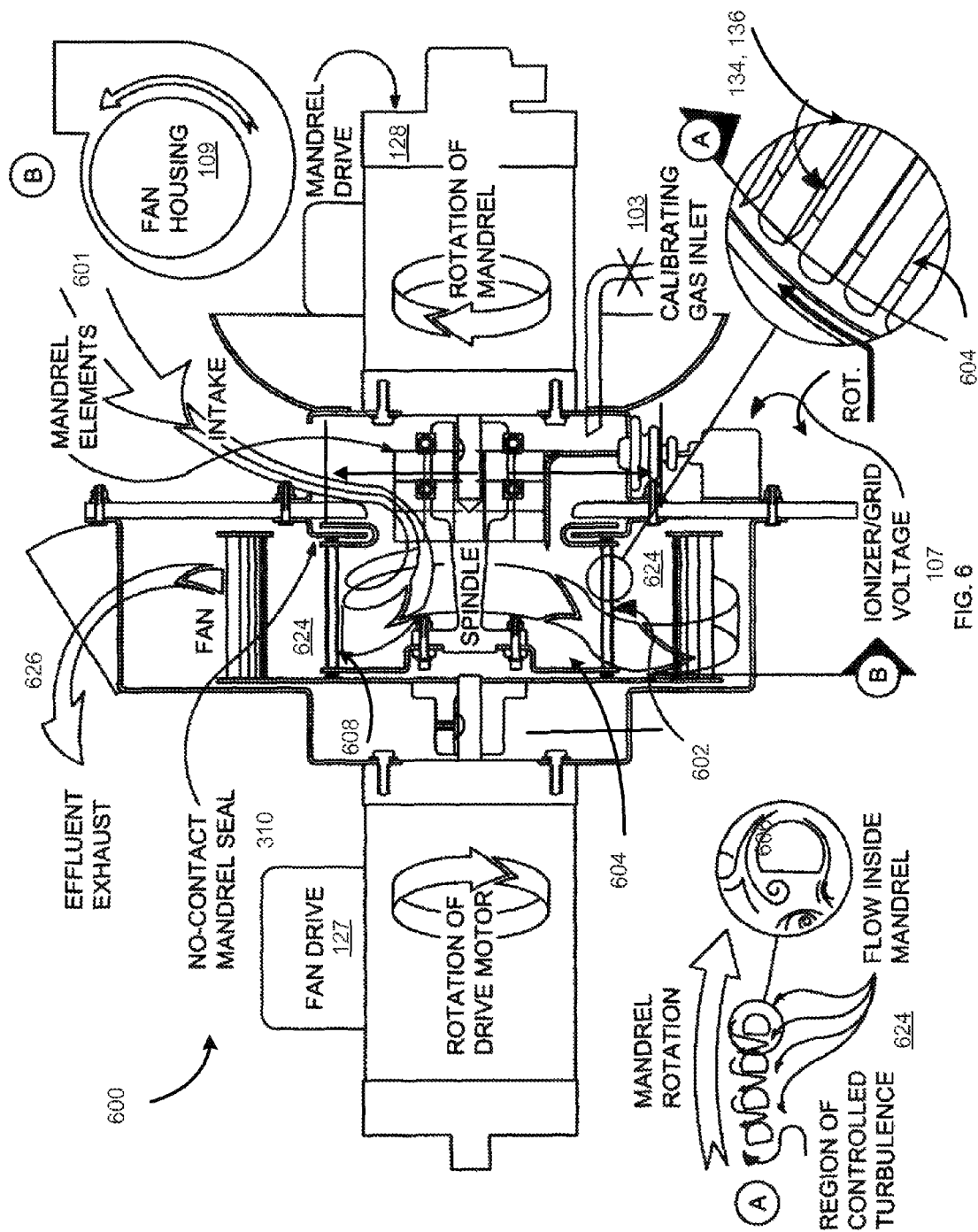
FIG. 6 is an illustration of a dynamic mandrel catalytic reactor using foils on a rotating mandrel drum driven by a motor that is a physical implementation of FIG. 2.

Referring to FIG. 6, system 600 illustrates dynamic mandrel catalytic reactor using foils on rotating mandrel drum driven by motor which system is a physical implementation of FIG. 2. In operation, system 600 draws in effluent input 601 to process through intake duct and channels effluent directly on mandrel 602 into inner surface 604 that is rotating by drive motor 128. Before passing to mandrel 602, effluent passes over labyrinth non-contact mandrel seal 310, which prevent unprocessed effluent passing by mandrel 602. Mandrel 602 attracts effluent by obtaining an oppositely polarizing charge emitted from source generator, e.g., obtaining 7 kv oppositely emitted charge by 7 kv ion generator 107. In another example the mandrel serves as a specialized sensing electrode. For example, specialized sensing electrode is piezoelectric crystal 314 (of FIG. 5), for instance, built into an "air bearing" or "air bearing format" that moves mandrel plate 302. By introducing microstructures or microcontours 132 on the specialized sensing electrode, effluent flow is converted, e.g., chops up, across the contact surface area 614 into a controlled region of unitized turbulent flow 624. As such, this structure of mandrel 602 provides averaging of effluent input. In yet another embodiment, mandrel 602 may have an inner surface that provides a cross-section for input fluids including effluent. In one example, mandrel 602 moves, e.g., oscillating, vibrating, or the like, and is electrically charged (air bearing electrode plates 316) with a mandrel plate voltage to provide attractive forces to more efficiently process effluent and to further augment an ability of mandrel 602 to detect input fluid.

In yet another variant, foils 134, 136, for example, illustrated in FIG. 7, induce process effluent into inner surface 604 of mandrel 602. Counter rotating fan 109, e.g., counter rotating squirrel cage fan, rotate opposite to mandrel 602 direction. In one variant, counter rotating fan 109 resides along a direction flow of mandrel 602, and aligned along outer diameter 605 surface of mandrel 602 to create a controlled turbulence region 624. Controlled turbulence region 624 creates mixing, flow rectification, and unitization of effluent. In yet another variant, mandrel 602 is disposed or impregnated on its contact surface area 614 formed by catalyst 104 and/or conductive material, e.g., referring to FIGS. 1 and 2, foils 134, 136 plated in gold, shedding vortices 116, interacts with effluent via region of controlled turbulence 624. Upon completion of processing, effluent of contact surface area per unit volume 608 flow passes through mandrel 602, and effluent is then exhausted via a counter rotating fan 109 (e.g., squirrel cage fan) via exhaust of effluent output 626.

Figure 8:
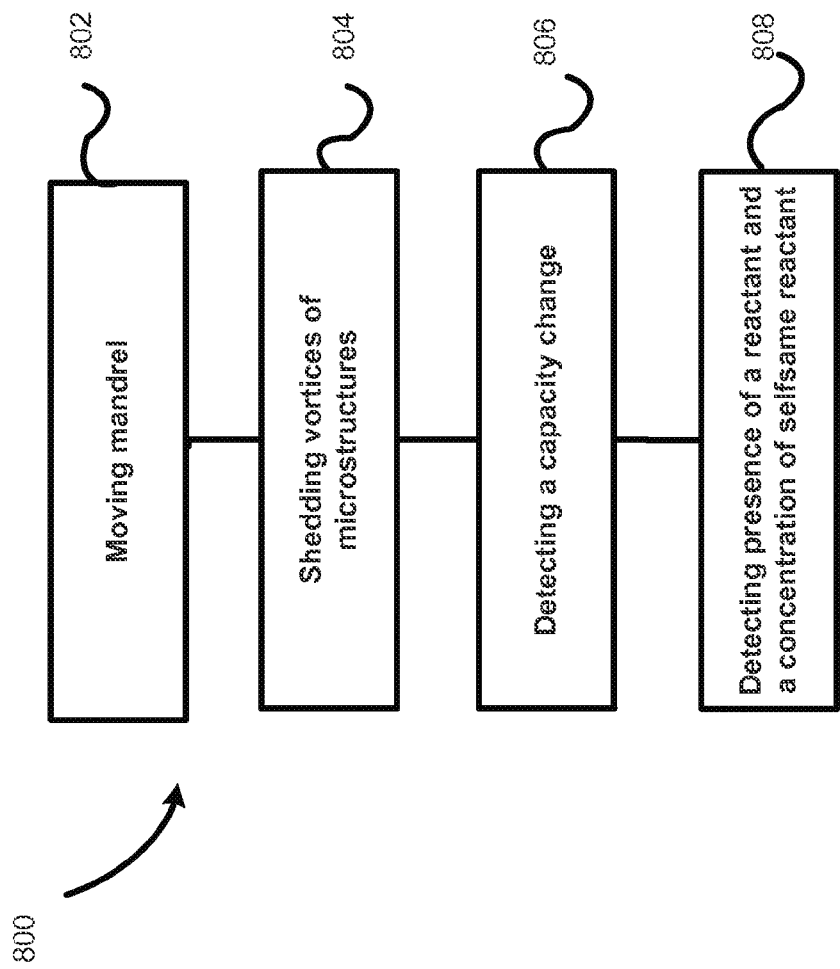
FIG. 8 is a method illustrating usage of the dynamic mandrel catalytic of FIGS. 1-7 in accordance with the present disclosure.

Referring to FIG. 8, method 800 reduces emissions from a catalytic reaction. In step 302, moving of mandrel 102, 202, 302, 602 includes moving of one or more micro-contours 128 having one or more reactive materials to control a rate of the catalytic reaction on a contact surface area 114, 214, 314, 614 per unit volume 108, 208, 308, 608 flow to control a level of emitted impurities (step 802). In one variant, moving includes at least one of vibrating, rotating, or cycling mandrel 102, 202, 302, 602 in a controlled manner. In one variant, the moving causes contoured foils 136, 606 on mandrel 102, 602 to interact with the reactant to increase a rate of exposure of contact surface area 114, 614 per unit volume flow over a controlled change in a contact surface area 114, 614.

In another variant, moving includes at least one of vibrating, rotating, or cycling mandrel 102, 202, 302, 602 in a controlled manner to cause contoured foils 136, 606 on mandrel 102, 202, 302, 602 to interact with the reactant or the selfsame reactant. In one variant, the interaction may maximize exposure to the contact surface area per unit volume flow 108, 208, 308, 608 over a controlled change in contact surface area 114, 214, 314, 614. In another variant, moving includes at least one of vibrating, rotating, or cycling mandrel in a controlled manner to cause an interaction with the reactant to increase an exposure to the mandrel contact surface area per unit volume flow via a controlled change in contact surface area. In another variant, moving a mandrel 102, 202, 302, 602 includes applying at least one of a non-uniform velocity, variable frequency, or motions involving one or more axes to create a desired effect to control a rate of catalyst 108. In one variant, the control a rate of catalyst 108 is available to react with a liquid, a gas, other phase, transition of phase, or throttling a reaction via a controlled change in contact surface area. Advantageously, dynamic mandrel catalytic reactor, e.g., system 200, requires a fraction of an amount of catalyst that a static unit would. Furthermore, rate of motion or rotation imparted on mandrel and rate of reaction per unit volume flow are directly rated to one another. To increase rate of reaction, then a rate of motion is increased with minimum addition in amount of catalyst.

In step 804, the method includes shedding vortices of microstructures 132 formed on either side of a mandrel 102, 202, 303, 602 to sweep a reacted material free. In step 806, the method includes detecting a capacity to react changes via a controlled change in mandrel speed. In step 808, the method includes detecting a presence of a reactant and a concentration of a self-same reactant. In one embodiment, accuracy of concentrations of process gas at a desired flow rate can be controlled by a feedback loop. Continuing with this embodiment, system 100, 200, 300, and 600 can be used in a scaled up device such as with a selective catalytic reduction unit in, for instance, a fossil fuel power plant industrial site in a commercial power or utility power plant to reduce emissions.

Advantageously, using principles of the present disclosure, contact surface area 114, 214, 314, 614 of about 8 foot diameter by 4 foot height dynamic mandrel coated with a catalyst rotating at 500 rpm can have several thousands of square feet more exposure per unit volume process flow than a static selective catalytic reactor with a comparable surface area of exposure. In one exemplary embodiment, mandrel 102, 202, 302, 602 may be coated with precious metals bound in ceramic. In yet another alternative, mandrel 102, 202, 302, 602 may be coated with conventional metal oxide or urea compounds. In another example, mandrel 102, 202, 302, 602 has limited surfaces, e.g., two surfaces, to clean and can be cleaned at approximately perpendicular angles (e.g., right angles) to contact surface area 114, 214, 314, 614, which makes flow essentially impervious to fowling. In contrast to the disclosed mandrel 102, 202, 302, and 602, conventional emissions systems having multiple elements (e.g., armatures) that are cleaned with flow parallel to a surface area of elements.

Furthermore, because motion of mandrel is a large factor or component in factors that make up a total surface area of contact per unit volume of flow, these units tend to be many orders of magnitude smaller in size than static counterparts to which is sole element of surface area of contact per unit volume of flow is based on surface area.

Advantageously, using principles of the present disclosure, a rotating mandrel coated with a catalyst generates an increased contact surface area as compared to static catalytic reactor systems. As such, size of the mandrel is not a singular limiting capacity of a reactor unit as compared to other non-rotation systems; thus, a rotating mandrel unit has a capacity by design greater than its size or input capacity so is adaptable to shift in unit capacity. Furthermore, advantageously, dynamic catalytic mandrel includes foils that rectify, unitize, and direct turbulence to adjust, tune or maximize surface area contact generated on a per velocity basis. In addition, advantageously, controlled turbulent flow is provided throughout mandrel contact surfaces including harmonic shedding of vortices.

In addition, due to size and rotational capacity of mandrel as compared to static or rotating armatures therein, mandrel 102 contact surface area is amendable to cleansing or disinfection on a regular or continuous basis. For example, contoured foils on the mandrel are designed to induce of shifting turbulent flows that sweep the contact surface area clean so as to maintain or increase reaction cycle even when flow of effluent increases.

We claim:

1. A method to reduce emissions from a catalytic reaction comprising:
   moving a mandrel including one or more micro-contours having one or more reactive materials to control a rate of the catalytic reaction on a contact surface area per unit volume flow to control a level of impurities emitted.

2. The method of claim 1, wherein moving includes at least one of vibrating, rotating, or cycling the mandrel in a controlled manner to cause contoured foils on the mandrel to interact with a reactant to increase a rate of exposure of the contact surface area per unit volume flow over a controlled change in a contact surface area.

3. The method of claim 1, wherein moving includes at least one of vibrating, rotating, or cycling the mandrel in a controlled manner to cause contoured foils on the mandrel to interact with a reactant to maximize exposure to the contact surface area per unit volume flow over a controlled change in a contact surface area.

4. The method of claim 1, wherein moving includes at least one of vibrating, rotating, or cycling the mandrel in a controlled manner to cause an interaction with a reactant to increase an exposure to the contact surface area per unit volume flow over a controlled change in a contact surface area.

5. The method of claim 1, further comprising shedding vortices of microstructures formed on either side to sweep a reacted material free.

6. The method of claim 1, wherein moving a mandrel includes applying at least one of a non-uniform velocity, variable frequency, or motions involving one or more axes to create a desired effect to control a rate of catalyst available to react with a liquid, a gas, other phase, transition of phase, or throttling a reaction via a controlled change in a contact surface area.

7. The method on claim 1, further comprising detecting a capacity to react changes via a controlled change in a mandrel speed.

8. The method of claim 1, further comprising detecting a presence of a reactant and a concentration of a selfsame reactant.

9. An apparatus causing a chemical reaction, the apparatus comprising:
   a mandrel capable of being plated, bonded, or by other means affixed with a catalyst and configured to be movable to control a rate of catalyst available to react via a controlled change in a contact surface area per unit volume flow to reduce or remove effluent matter as a result of a reaction process; and
   a drive motor operatively coupled to the mandrel to impart a vibration on microstructures of the mandrel to shed vortices on one or both sides of the microstructures to sweep the microstructures free of reacted material to aid in increasing a reaction cycle of a contact surface area.

10. The apparatus of claim 9, wherein the mandrel includes foils that create a controlled turbulent flow throughout mandrel contact surfaces including harmonic shedding of vortices or processes that cause slipstreaming to induce the turbulent flow into pathways that unitize and rectify the turbulent flow.

11. The apparatus of claim 9, wherein the mandrel includes bluff bodies or various shaped rods to cycle a controlled shift in recombinant flow causing a harmonic shedding of vortices.

12. The apparatus of claim 9, comprising the drive motor operatively coupled to the mandrel to impart a controlled cyclic rotation of the mandrel to create a predetermined rate of rotation that controls a change in the contact surface area to maintain a predetermined capacity to react.

13. The apparatus of claim 9, comprising the drive motor operatively coupled to the mandrel to impart a controlled cyclic rotation of the mandrel to maximize a volume flow over contoured foils that induce flow thru the mandrel.

14. The apparatus of claim 13, wherein the contoured foils are designed to induce of shifting turbulent flows that sweep the contact surface area clean to increase rapid reaction cycle.

15. The apparatus of claim 9, wherein the contact surface area is capable of forming a molecular layer responsive to a rate of a decomposed reactant and to insulate the reactant from the catalyst and limit a rate of reaction.

16. The apparatus of claim 9, wherein the mandrel includes a large surface area to actual volume ratio to react process gas concentrations within a tight tolerance.

17. The apparatus of claim 9, wherein the mandrel includes at least one of silver plating and the reactant material includes $H_2O_2$ gas.

18. A system to reduce emissions from a catalytic reaction:
   a mandrel configured to move one or more micro-contours containing one or more reactants to control a rate of the catalytic reaction on a contact surface area per unit volume flow to control a level of impurities emitted; and
   a drive motor to move the mandrel in a manner to cause an interaction with the one or more reactants to exposure the contact surface area per unit volume flow over a controlled change in a contact surface area.

* * * * *